Figure 2:
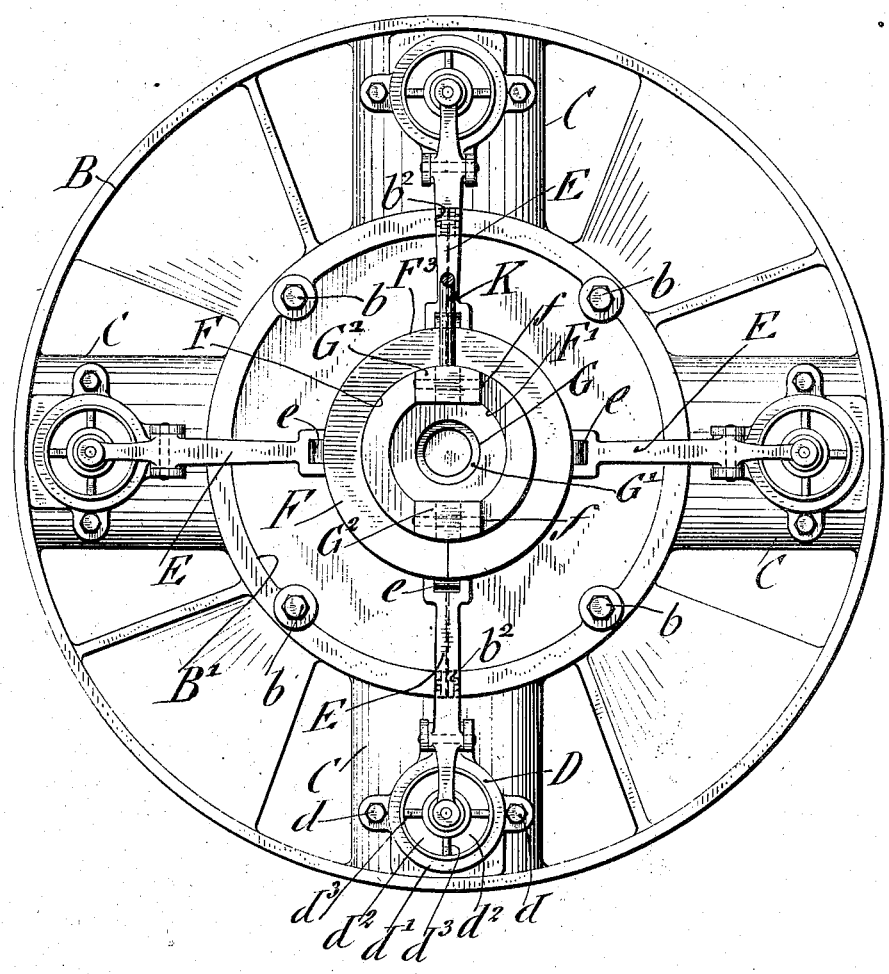

T. WILLIAMS.
TRANSMISSION DEVICE FOR AUTOMOBILES.
APPLICATION FILED JAN. 28, 1907.
910,981.  Patented Jan. 26, 1909.
3 SHEETS—SHEET 1.
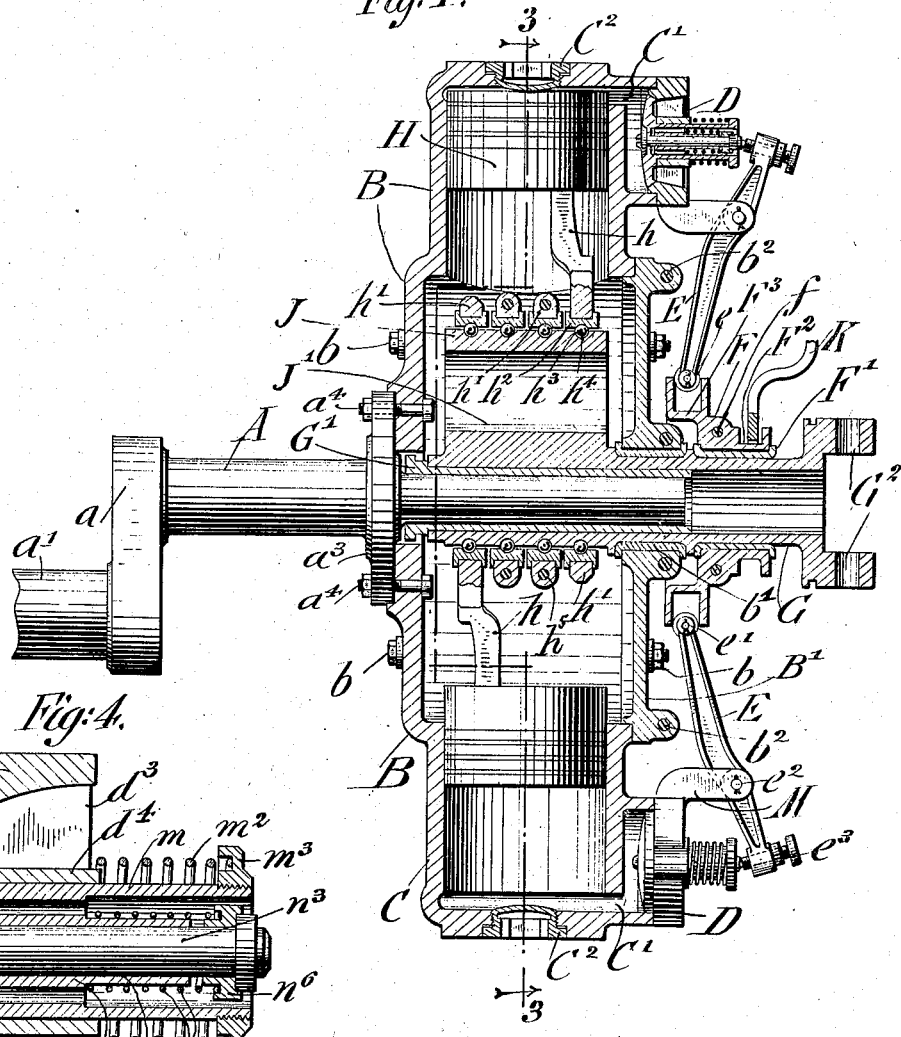
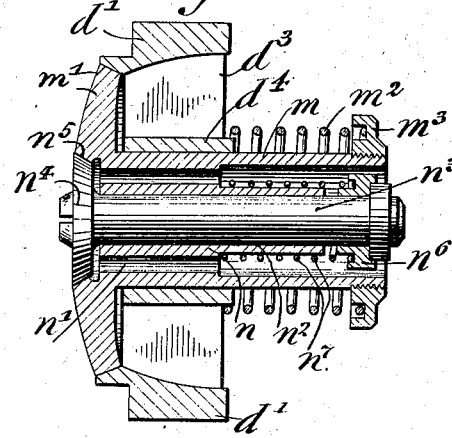

T. WILLIAMS.
TRANSMISSION DEVICE FOR AUTOMOBILES.
APPLICATION FILED JAN. 28, 1907.

910,981.

Patented Jan. 26, 1909.

3 SHEETS—SHEET 2.

Witnesses:

Inventor
Thomas Williams
By his Attorneys

T. WILLIAMS.
TRANSMISSION DEVICE FOR AUTOMOBILES.
APPLICATION FILED JAN. 28, 1907.
910,981.
Patented Jan. 26, 1909.
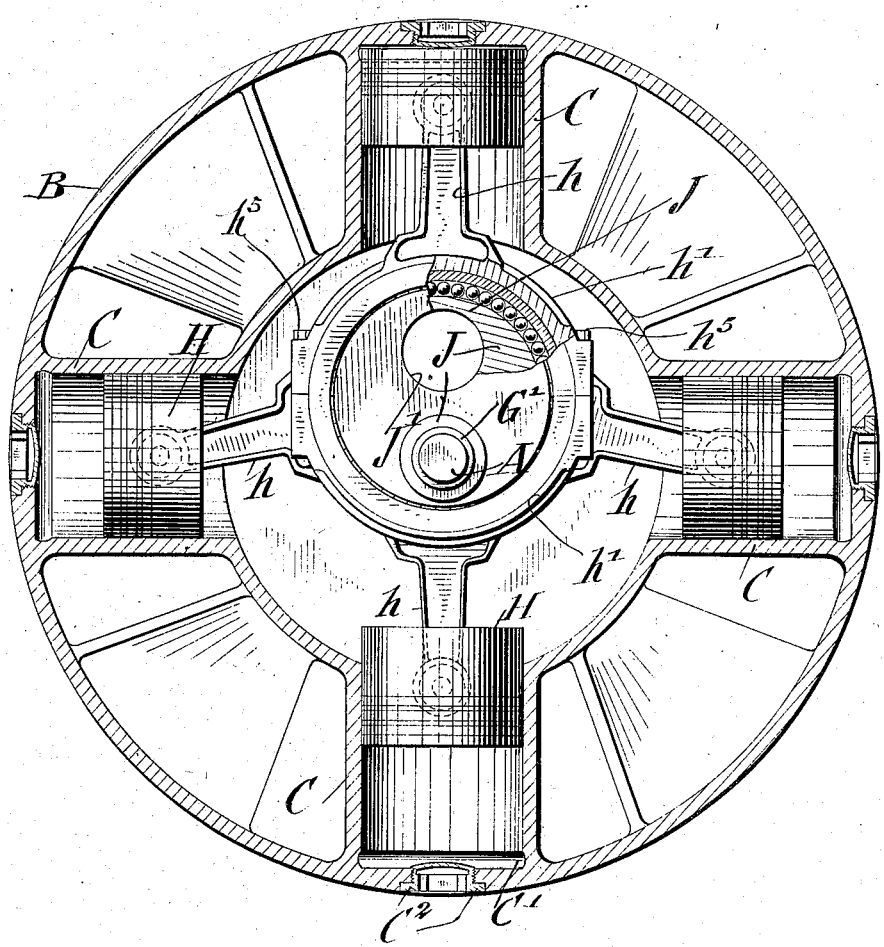

UNITED STATES PATENT OFFICE.

THOMAS WILLIAMS, OF NEW YORK, N. Y., ASSIGNOR TO RICHARD W. BUCKLEY, JR., OF NEW YORK, N. Y.

TRANSMISSION DEVICE FOR AUTOMOBILES.

No. 910,981.  Specification of Letters Patent.  Patented Jan. 26, 1909.

Application filed January 28, 1907. Serial No. 354,475.

*To all whom it may concern:*

Be it known that I, THOMAS WILLIAMS, a subject of the King of Great Britain, and a resident of the borough of Bronx, city of New York, and State of New York, have invented certain new and useful Improvements in Transmission Devices for Automobiles, of which the following is a description.

This invention relates to transmission devices for automobiles, and has for its object to provide transmission means by which power may be transmitted from the power shaft to the driving shaft of an automobile and the speed of the driving shaft simultaneously regulated from the lowest desired to that of the power shaft.

The object of the invention also is to provide such means whereby any speed from stand-still to the highest speed of the engine may be imparted to the driving shaft in a uniform manner and without jar or abruptness in passing from one speed to another.

For this purpose my invention consists in certain novel features and combinations of parts, which will be fully described hereinafter and finally pointed out in the claims.

In the accompanying drawings, Figure 1 represents a vertical longitudinal section of my improved device showing some parts in elevation, Fig. 2 represents an end view in elevation, Fig. 3 represents a vertical transverse section taken on line 3—3 of Fig. 1, with some parts in elevation, and Fig. 4 represents an enlarged view of one of the valves of the cylinders.

Similar letters of reference indicate corresponding parts.

My invention consists, in providing the flywheel, which is secured to the power shaft of the motor of the automobile, with a plurality of cylinders having valves and pistons, the piston rods of which are operatively connected with the driving shaft of the automobile. By so regulating the valves as to permit the free ingress and egress of air or other suitable operating fluid to the cylinders, little or no resistance will be offered to the pistons and hence no power will be transmitted to the driving shaft on the rotation of the fly-wheel. If, however, the valves are so operated as to permit the free ingress of the operating fluid, but to prevent its egress, resistance will be offered to the pistons during their compression strokes, and hence power will be transmitted to the driving shaft. By these means, power is transmitted from the power shaft to the driving shaft and to the driving shaft is imparted a speed directly proportionate to the resistance offered the compression strokes of the pistons.

Referring to the drawings, A represents the power shaft, suitably driven, which is provided with a crank-arm $a$ having a crank-pin $a^1$, operatively connected with some suitable motor, and with a flange $a^3$, which is secured to a fly-wheel B by means of bolts $a^4$. The fly-wheel B is provided with cylinders C diametrically arranged, open at their inner ends and having at their outer ends detachable cylinder-head caps $C^2$ removable for cleaning purposes, said cylinders having lateral openings $C^1$ communicating with the chambers of the valves D, regulatable by means of pivoted arms E, which are operated by means of a collar F, loosely mounted and rotatable on the driving shaft G. Movable in the cylinders C are pistons H, the piston rods $h$ of which are provided with eccentric bands $h^1$ having ball-bearings $h^2$, $h^3$, engaging the grooves $h^4$ of the eccentric J. The bands $h^1$ consist of two parts, which are secured together by means of bolts $h^5$. The eccentric J is provided with an opening $J^1$ and is either suitably secured to the driving shaft G, or, as shown in the drawings, is integral therewith.

A cover $B^1$ is secured to the fly-wheel B by means of bolts $b$, and is provided with an opening having a bearing $b^1$, through which the driving shaft G passes. The cover $B^1$ is formed of two parts, which are suitably assembled by means of bolts $b^2$. Interposed between the power shaft A and eccentric J is a sleeve $G^1$, rotatable with the eccentric. The driving shaft G is provided with one member $G^2$ of a universal-joint coupling, by means of which it is connected with the driving shaft of the automobile, which transmits its motion to the driving axle. Movable to and fro on the driving shaft G is the collar F, provided with a bearing $F^1$, which collar is provided with a groove $F^2$, engaged by a fork K operatively connected with the operating handle of the automobile. The collar F consists of two parts connected together by means of bolts $f$. The collar F is also provided with a groove $F^3$, which is engaged by rollers $e$ rotatable on axles $e^1$ supported by the ends of the arms E, which are pivoted to extensions M by means of shafts $e^2$, and which are provided at their other ends with adjustable valve-operating screws $e^3$.

The valves D are secured to the cylinders by means of bolts $d$, and each consists of a casing $d^1$ which is provided with opening $d^2$ separated by walls $d^3$, which walls $d^3$ support a central collar $d^4$, which is provided with a circular opening, through which the cylindrical valve-member $m$ passes. This member is provided with a valve-disk $m^1$, which seats itself on the valve-casing $d^1$. A spring $m^2$ is interposed between the flange $m^3$ of the member $m$ and the collar $d^4$ of the casing $d^1$. The valve-member $m$ is provided with an inner concentric part $n$, which is provided with a plurality of openings $n^1$ and with a central opening $n^2$ for the passage of a valve-stem $n^3$, one end of which is provided with a valve disk $n^4$ adapted to seat itself on a seat $n^5$ of the valve-disk $m^1$, while the other end is provided with a flange $n^6$, between which and the part $n$ a helical-spring $n^7$ is interposed. It will be noticed that with the parts in the position shown in Fig. 4, the part $n$ does not extend outwardly sufficiently to abut against the flange $n^6$.

The operation of my improved device is as follows: With the collar F in the position shown in Fig. 1, when one of the pistons begins its suction stroke, the disk $n^4$ and the disk $m^1$ of the valve D will be drawn inwardly and off their seats, whereby air or other suitable operating fluid will be caused to enter the interior of the cylinder and completely fill the same. On the compression stroke of the piston the valve-disk $m^1$ will be pressed against its seat and by the compression of the air so entrapped, resistance will be offered to the movement of the piston. Thereby, the eccentric J and the driving-shaft G will be rotated, and, if the maximum resistance is offered, at the same speed as the fly-wheel B. If, however, the collar F be shifted and caused to be placed at the end of its outward movement on the driving shaft G, then the valve-rod $n^3$ will be pressed inwardly by abutment with the screws $e^3$ of the corresponding arm E and the valve-disk $n^4$ raised from its seat $n^5$. The operating fluid will thereby exhaust through openings $n^1$. By the continued inward movement of the valve-rod $n^3$, the flange $n^6$ will engage the tubular part $n$, and cause it together with the valve-disk $m^1$ to be moved inwardly, and thereby raised from its seat. By reason of the adjustability of the valve-operating screws $e^3$ the extent to which the valves D are opened by the operating arms when said arms are shifted through a certain distance, can be regulated, as will be understood. On the compression stroke of the pistons the air will be exhausted from the cylinders. No appreciable resistance being offered to the pistons, the eccentric will not be actuated, and hence the driving shaft G will not be rotated. Between these two extreme conditions many intermediate speeds may be attained.

By my improved device the friction clutch and speed changing gears are done away with, and any speed from standstill to that of the speed of the engine may be obtained, without jar from one speed to the other. The parts are simple, interchangeable and are accessible to cleaning and repairs, while the transmission is positive, and the reduction in expense in the construction of automobiles material.

Having thus described my invention, I claim as new and desire to secure by Letters Patent:

1. In a transmission device, the combination, with a fly-wheel mounted on the power-shaft and provided with a plurality of cylinders, a driving-shaft, and pistons operatively connected with said driving-shaft and operating in said cylinders, of spring-controlled valves for the cylinders, each composed of two parts arranged to open successively, and means for operating said valves.

2. In a transmission device, the combination, with a fly-wheel secured to the power-shaft and having a plurality of cylinders, a driving-shaft, and pistons connected with said driving-shaft and operating in said cylinders, of spring-controlled valves carried by the cylinders, and each composed of two spring-cushioned successively acting parts one of which is opened when the other is pushed in a certain distance, pivoted arms to abut against and operate said valves, and means for actuating said arms.

3. In a transmission device, the combination, with a fly-wheel secured to the power-shaft and having a plurality of cylinders, a driving-shaft, and pistons connected with said driving-shaft and operating in said cylinders, of spring-controlled valves for the cylinders, each composed of two spring-cushioned successively-acting parts one of which is opened when the other is pushed in a certain distance, and means for simultaneously pushing in and operating all of said valves.

4. In a transmission device, the combination, with a fly-wheel secured to the power-shaft and having a plurality of cylinders, a driving-shaft, and pistons connected with said driving-shaft and operating in said cylinders, of spring-controlled valves for the cylinders, each composed of successively-acting parts one of which is opened when the other is pushed in a certain distance, pivoted arms, adjustable valve-operating screws carried by said arms, and means to simultaneously actuate said arms to push in and open the valves.

In testimony, that I claim the foregoing as my invention, I have signed my name in presence of two subscribing witnesses.

THOMAS WILLIAMS.

Witnesses:
JOHN B. TODD,
C. P. GOEPEL.